E. C. SINGER.
Sewing Machine.
No. 26,130.
2 Sheets—Sheet 1.
Patented Nov. 15, 1859.
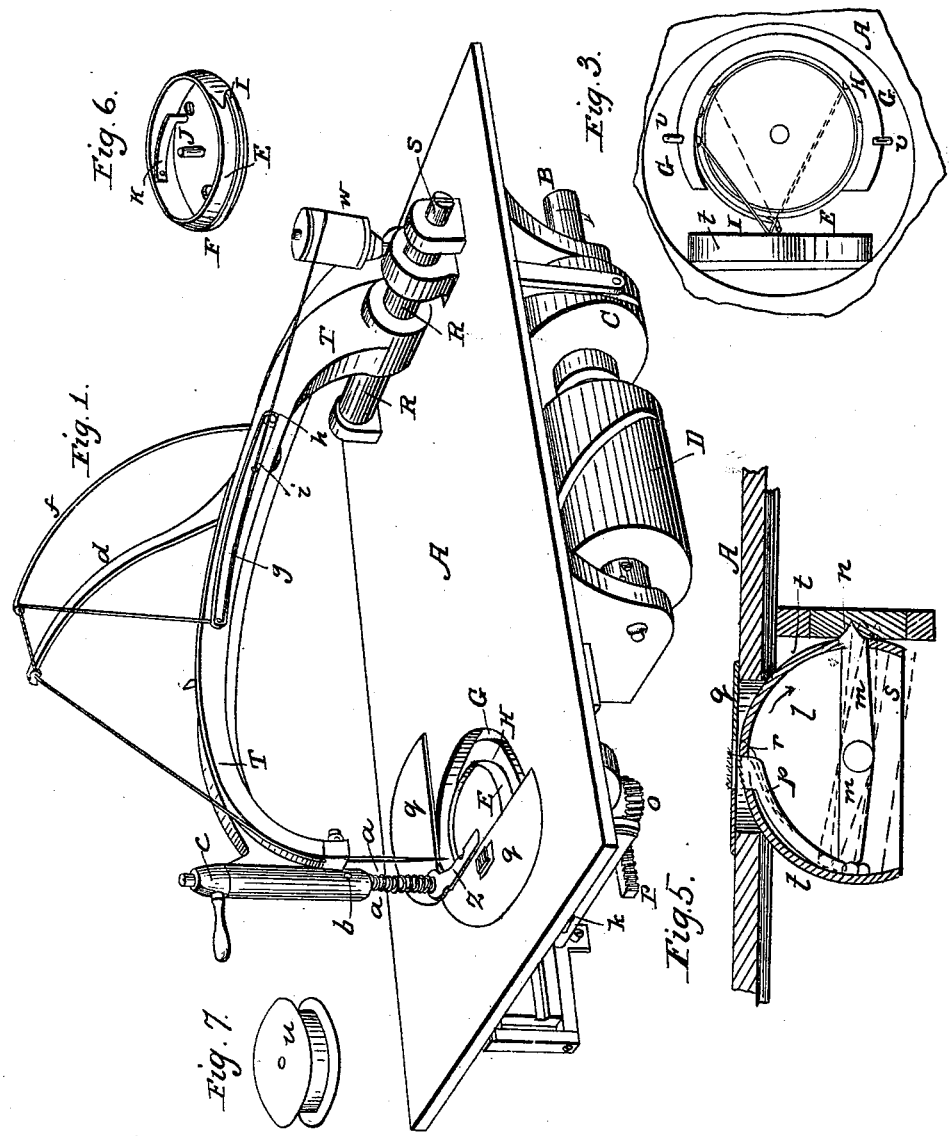
Witnesses
Inventor
E. C. Singer E. C. SINGER.
Sewing Machine.
No. 26,130.
2 Sheets—Sheet 2.
Patented Nov. 15, 1859.
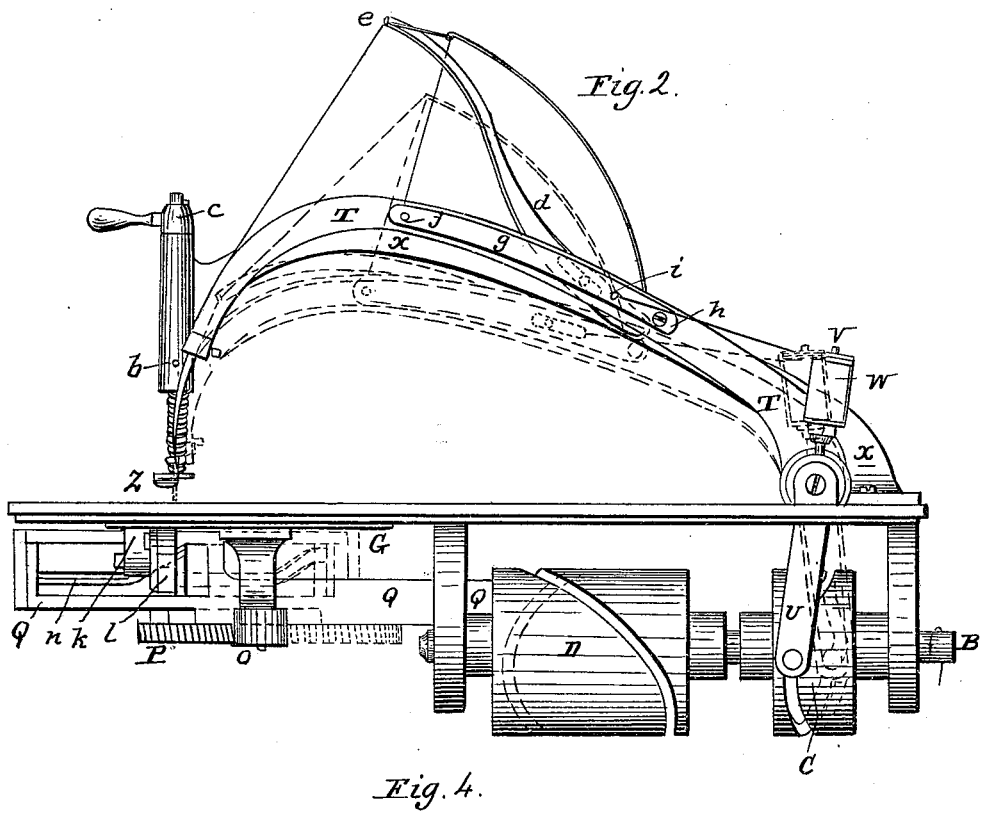
Witnesses:
Inventor:
E. C. Singer

United States Patent Office.

E. C. SINGER, OF PORT LAVACA, TEXAS.

IMPROVEMENT IN SEWING-MACHINES.

Specification forming part of Letters Patent No. 26,130, dated November 15, 1859.

*To all whom it may concern:*

Be it known that I, E. C. SINGER, of Port Lavaca, in the county of Calhoun and State of Texas, have invented certain new and useful Improvements in Sewing-Machines; and I do hereby declare that the following is a full and exact description thereof, reference being had to the accompanying drawings, which make a part of this specification, and to the letters of reference marked thereon.

The nature of my invention relates to the construction and mode of operation of the feed device.

In reference to the drawings, Figure 1 is a perspective view. Fig. 2 is a side elevation. Fig. 3 is a plan of the shuttle illustrating its operation in passing the loop over itself, also including a plan of the feed device. Fig. 4 is a sectional view of the shuttle, parts for actuating the same, &c. Fig. 5 is a sectional view illustrating the feed device. Fig. 6 is a perspective view of the shuttle, (spool removed.) Fig. 7 is a perspective view of the spool.

A is the bed-plate. To it are secured the other parts.

B is the main shaft, to which power is applied by crank or otherwise to drive the machine. On this shaft are arranged the cam C to operate the needle-arm, and the cam D to operate the feed and shuttle movements.

E is the shuttle, and is provided with a small flange, F, around its periphery. This flange rests upon plate G, on which and under plate H it is fitted loosely, so as to allow the passage of the loop around the shuttle. On one side of the shuttle is formed the hook I, to catch the loop formed by the needle passing downward. The shuttle E is hollow to receive the spool, and has the pin J in its center, on which the spool turns. On the inside of the upright rim of the shuttle is attached the little spring K, which presses upon the coil of thread on the spool, keeping the spool in place and giving tension to the thread. A small hole is made through the rim of the shuttle, (see near the letter F, Fig. 6,) out through which the thread passes from the spool. Two round sockets are made in the bottom of the shuttle, into which play the two prongs of the fork L on the upper end of shaft M. This shaft M has its upper end inclined toward the front of the machine, so that while both prongs of the fork enter the sockets in the under side of the shuttle when in the position represented in Fig. 4, they each in turn leave their respective sockets immediately on passing forward of that position, so that one or the other of them are in its socket all the time to drive the shuttle. This arrangement allows the thread of the loop to pass them one at a time, while each in its turn is forward of the center and out of its socket. A stand, N, is secured to the under side of the bed-plate and forms the bearing for the shaft M. On the lower end of shaft M is the pinion O, which is driven by the rack P, secured to the sliding bar Q. This bar Q has a pin in its end which plays into the groove in cam D, whereby it receives its reciprocating motion from the rotation of cam D. The pinion O is of such proportions as to receive a reciprocating rotary motion of about two-thirds of a revolution from the rack P, which motion is transmitted to the shuttle through shaft M and its fork, as before described.

The shaft R is mounted on the pivots S, and has secured to it the needle-arm T, also the arm U, a pin in the lower end of which plays in the groove in cam C. A pin, V, is fixed in shaft R on which is placed a spool, W, of thread. A stationary arm, X, fast to the bed-plate A, passes forward as far as the end of the needle-arm, and vertically through its end passes a small rod on which is the foot Z to hold the work down upon the feeding device. This foot is pressed down by the spring *a*, while the pin *b* prevents it from turning round, and a cam, *c*, operating upon a pin at its top end serves to lift it when required. A slack arm, *d*, is also pivoted to this arm X, and has a slot near its back end in which plays a pin which is fast to the needle-arm. This pin in the needle-arm causes the slack arm to move up and down, as required, to draw up the slack of the thread after it passses around the shuttle, the thread being passed through the hole at *e*.

*f* is a spring, through a hole in the end of which the thread also passes, so to provide against any case in which the movement of the slack arm *d* should fail to be accurately adjusted in relation to the movement of the shuttle. A tension-spring, *g*, is held and adjusted by means of the screw *h* upon the side of the needle-arm, and has a pin, J, fast in its forward end, which fits in a socket in the needle-arm. It also has a small hole, *i*, near its back end through which the thread passes directly from the spool. This spring is bent so as to bear only at the forward end upon the thread which passes from the hole $i$, around the pin J under the spring $g$, thence through the end of spring $f$ and the slack arm, thence through the guide-hole in the end of the needle-arm to the needle's eye. Under the bed-plate A and pivoted to a bracket, $k$, is the plate $l$, around the circular edge of which is formed a flange, $t$, within which, and pivoted concentrically therewith, is the lever $m$, one end of which passes through an opening in said flange and plays into the groove $n$ in bar Q, from which it receives, as the bar moves back and forth, a vibratory movement during the upward passage of the needle, and while it is at the upper part of its stroke. A portion of the groove $n$ being parallel to the line of motion of the bar Q allows the lever $m$ to remain at rest during the downward passage of the needle and a part of the upward till clear of the work. The other end of the lever $m$ is attached to the lower end of block $p$. The other end of this block has a toothed or rough surface arranged level or nearly so with the surface of plate $q$ on which the work rests while being sewed. On block $p$ is the vertically-arranged surface at $r$, which, acting as an incline plane in relation to the direction of motion received from the lever $m$, causes, by its contact with flange $t$, the toothed surface of block $p$ to be thrown up vertically during the first part of the movement received from the lever, after which the lever comes in contact with the stop at $s$, which being fast to plate $l$ causes this plate to tilt in the direction indicated by the arrow carrying with it the block $p$, and so giving a forward motion to the work being sewed. The return movement of the bar Q produces in a similar manner the return movement of the block $p$.

For the purpose of adjusting the length of stitches, the stop at $s$ has its acting-point arranged eccentrically to its shank, so that by turning it more or less the lever $m$ comes in contact with it sooner or later during the range of its motion, thereby communicating a greater or less amount of the tilting movement to the plate $l$, so giving a longer or shorter stitch, as required.

Having set forth the construction, I will proceed to describe the operation of my improvements.

The spool $u$, being filled with thread, is placed within the shuttle E, the end of the thread being first passed outward through the hole seen near F in Fig. 6. The spring K presses upon the thread between the flanges of the spool, keeping the shuttle in place and giving tension to the thread. The shuttle is then placed and the plate H fastened around it by means of the pins $v$, the hooked heads of which are turned around upon its edge. The end of the thread is then passed up through a hole in plate $q$, after which the plate $q$ is closed over the shuttle. A spool of thread is then placed upon the pin V and the end of the thread passed through and under the spring $g$, around pin J, thence through the end of spring $f$ and slack arm $d$ and the end of the needle-arm to the needle's eye. This end, with that of the thread from the shuttle, should be held by the finger or otherwise until two or three stitches are formed. The foot Z now being lifted by means of cam $c$, the work to be sewed is placed under it, when it is let down. Motion now being given to the shaft B in the direction indicated by the arrow, cam C, operating upon arm U, causes the needle-arm to drive the needle downward through the work. Meanwhile the cam D, acting upon bar Q, gives motion to rack P, which, acting upon pinion O, brings the shuttle to the position shown in Fig. 3. There the hook I catches the loop of the thread and passes onto the position indicated by red lines in Fig. 3, at which point the needle-arm, having commenced to return, acts, as previously described, upon the slack-arm $d$, which now completes the passing of the thread over the shuttle and takes up the slack, the thread passing the prongs of the fork L one at a time, as before described. The spring $f$ meanwhile serves to preserve the uniformity of tension by providing against any imperfection in the adjustment of the action of the slack-arm to the movements of the shuttle which now returns for the next loop. Meanwhile the groove $n$ in bar Q, acting upon lever $m$, and through it the block $p$ and plate $l$, causes, while the needle rises and is in the upper part of its stroke, the work to move forward a distance equal to the required length of stitch. Thus one stitch is formed and the work moved forward for another, and others will be formed with expedition proportionate to the speed at which the shaft B is driven.

Having thus described my invention, what I claim therein as new, and desire to secure by Letters Patent, is as follows:

The feed device, the essential features of which are the plate $l$, the block $p$, and the lever $m$ and stop $s$, operated by the grooved sliding bar Q, arranged and constructed substantially in the manner and for the purposes set forth.

In testimony of which invention I have hereunto set my hand.

E. C. SINGER.

Witnesses:
 WM. LONGNECKER,
 E. H. SAYRA.